United States Patent
Looije et al.

(10) Patent No.: US 9,604,390 B2
(45) Date of Patent: Mar. 28, 2017

(54) COMPONENT OF A MOLDING SYSTEM

(71) Applicant: Husky Injection Molding Systems Ltd., Bolton (CA)

(72) Inventors: Adrian Peter Looije, Aurora (CA); Sami Samuel Arsan, Mississauga (CA); James Osborn Plumpton, Enosburg Falls, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 50 days.

(21) Appl. No.: 14/760,667

(22) PCT Filed: Nov. 14, 2013

(86) PCT No.: PCT/CA2013/050869
§ 371 (c)(1),
(2) Date: Jul. 13, 2015

(87) PCT Pub. No.: WO2014/082169
PCT Pub. Date: Jun. 5, 2014

(65) Prior Publication Data
US 2015/0375426 A1    Dec. 31, 2015

Related U.S. Application Data

(60) Provisional application No. 61/731,678, filed on Nov. 30, 2012.

(51) Int. Cl.
| | | |
|---|---|---|
| B29C 45/28 | (2006.01) |
| B29C 45/27 | (2006.01) |
| B29C 33/38 | (2006.01) |
| B29C 45/26 | (2006.01) |
| B22C 9/06 | (2006.01) |
| B22D 17/22 | (2006.01) |
| B29L 31/00 | (2006.01) |

(52) U.S. Cl.
CPC ............... *B29C 33/38* (2013.01); *B22C 9/06* (2013.01); *B22D 17/22* (2013.01); *B29C 45/26* (2013.01); *B29C 45/2806* (2013.01); *B29C 2045/2774* (2013.01); *B29L 2031/757* (2013.01)

(58) Field of Classification Search
CPC .............................................. B29C 2045/2774
See application file for complete search history.

(56) References Cited

U.S. PATENT DOCUMENTS

| | | |
|---|---|---|
| 5,204,055 A | 4/1993 | Sachs et al. |
| 5,387,380 A | 2/1995 | Cima et al. |
| 5,490,882 A | 2/1996 | Sachs |
| 5,616,294 A | 4/1997 | Deckard |

(Continued)

FOREIGN PATENT DOCUMENTS

| | | |
|---|---|---|
| CA | 2565933 | 12/2005 |
| CA | 2682136 | 11/2008 |

(Continued)

OTHER PUBLICATIONS

International Search Report from International Application No. PCT/CA2013/050869, dated Dec. 31, 2013.

*Primary Examiner* — Robert B Davis

(57) ABSTRACT

Disclosed herein, amongst other things, is a component of a molding system, and a related method for the manufacture thereof, that has a body with a support matrix defined in at least a portion thereof.

17 Claims, 4 Drawing Sheets

(56) References Cited

U.S. PATENT DOCUMENTS

| | | | |
|---|---|---|---|
| 5,640,667 A | 6/1997 | Freitag | |
| 5,775,402 A | 7/1998 | Sachs | |
| 5,814,161 A | 9/1998 | Sachs | |
| 6,109,332 A | 8/2000 | Sachs | |
| 6,112,804 A | 9/2000 | Sachs | |
| 6,354,361 B1 | 3/2002 | Sachs | |
| 2011/0008532 A1* | 1/2011 | Feick | B22D 17/2023 427/135 |
| 2011/0183030 A1* | 7/2011 | Belzile | B29C 45/27 425/547 |

FOREIGN PATENT DOCUMENTS

| | | |
|---|---|---|
| CA | 2764170 | 1/2011 |
| CN | 1968801 A | 5/2007 |
| EP | 0916437 | 5/1999 |
| EP | 782487 | 9/1999 |
| JP | 3752427 | 3/2006 |
| JP | 4382673 | 12/2009 |
| WO | WO 0053359 | 9/2000 |
| WO | WO 02092264 | 11/2002 |

* cited by examiner

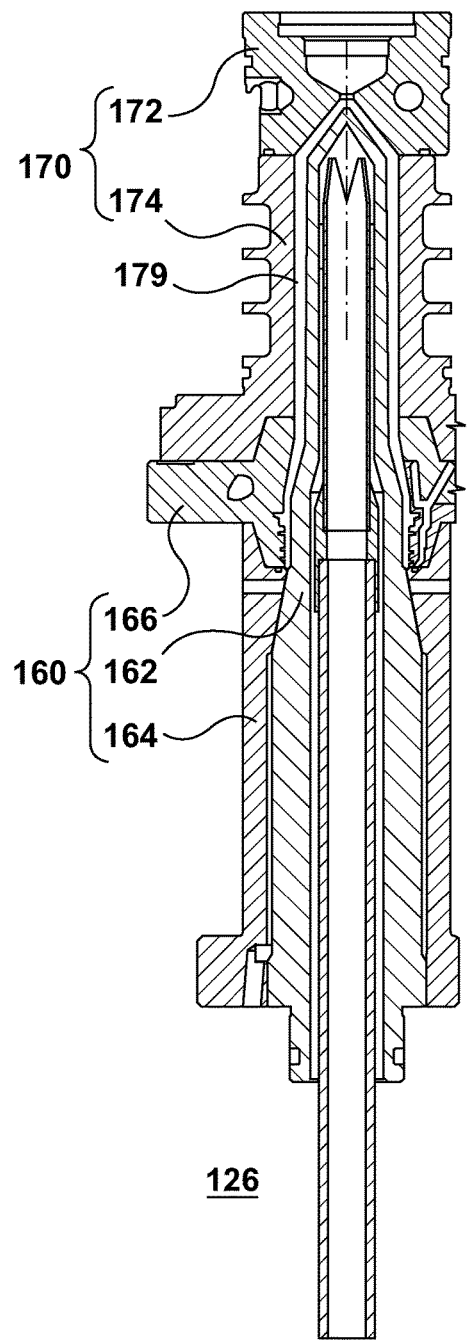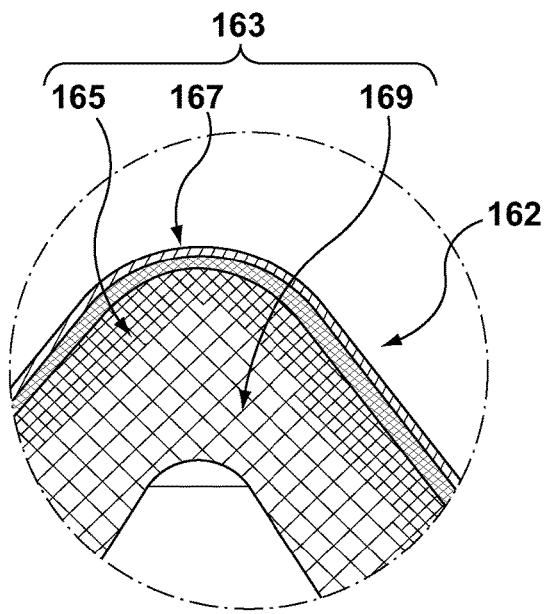
FIG. 3
126
FIG. 2

COMPONENT OF A MOLDING SYSTEM

TECHNICAL FIELD

Non-Limiting embodiments disclosed herein generally relate to a component of a molding system and a related method for the manufacture thereof.

SUMMARY

In accordance with an aspect disclosed herein, there is provided a component of a molding system that has a body with a support matrix defined in at least a portion thereof.

In accordance with another aspect disclosed herein there is provided a method of making a component of a molding system that includes manufacturing a body that has a support matrix defined in at least a portion thereof.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which:

FIG. 2 depicts a section view through a mold stack in accordance with a non-limiting embodiment;

FIG. 3 depicts an enlarged section view of a tip of a core insert of the mold stack of FIG. 2;

Figure 1:
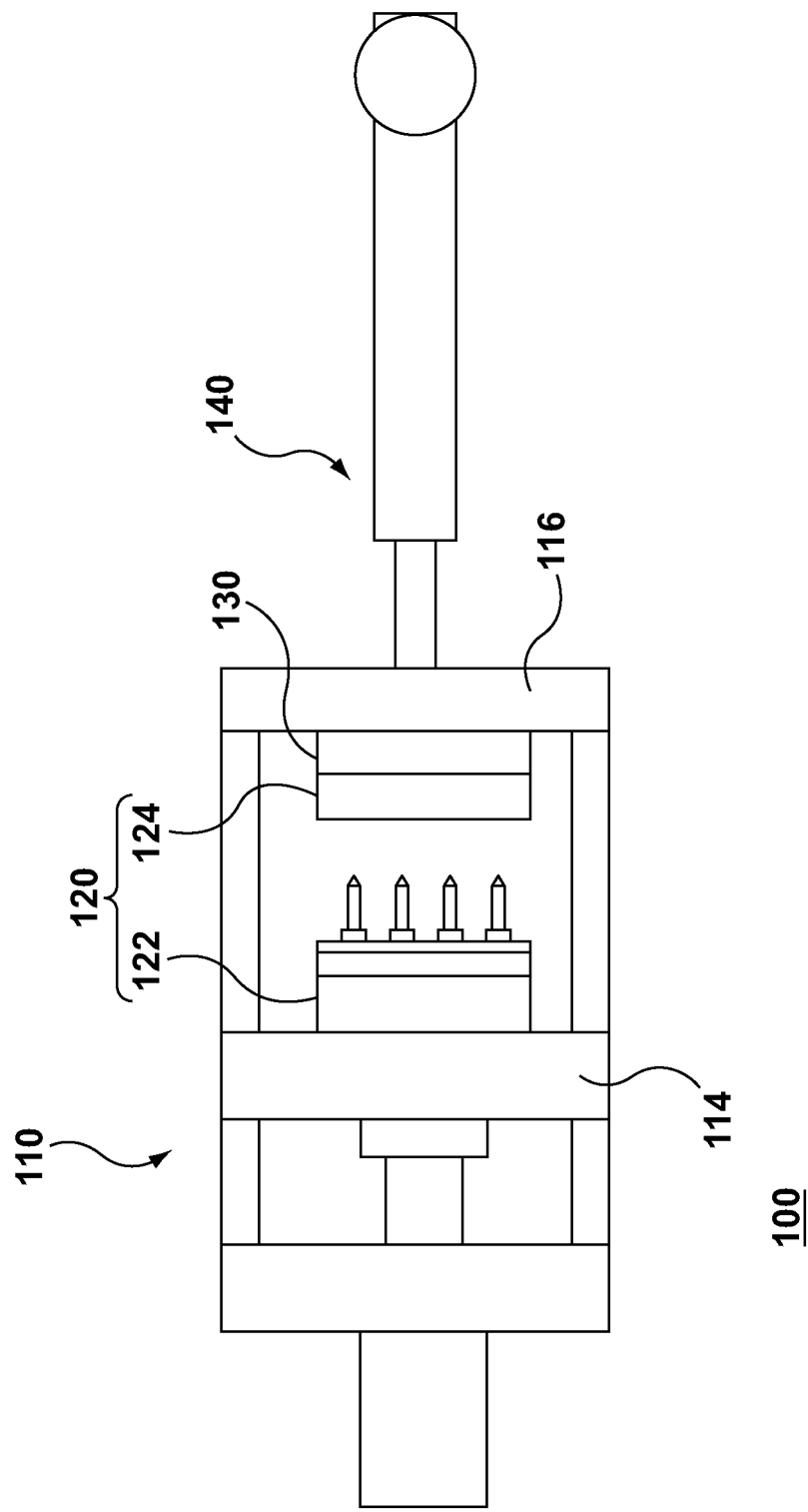
FIG. 1 depicts a schematic representation of a molding system according to a non-limiting embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a component of a molding system and a related method for the manufacture thereof. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Introduction

Disclosed herein are structure and steps related to providing a component of a molding system, such as, for example, a member of a mold stack within a mold that defines part of a mold cavity or a part of a molding material distributor. The component has a body having a support matrix defined in at least a portion thereof. The support matrix is provided by a three-dimensional web of structural supports. The configuration (i.e. shape and size) of the support matrix is not particularly limited. For example, the support matrix may be configured to be uniform throughout, wherein the structural supports are similarly configured and outline voids therebetween of fairly consistent size. Alternatively, the support matrix may instead define a relatively irregular array of structural supports. For example, the structural supports within the array may vary in size and shape. Furthermore, or instead, the spacing between the structural supports may be varied wherein the voids that are defined between the web of supports gradually change in volume thereacross. As such, it should be clear that the configuration of the web of supports is not particularly limited and may be, for example, a regularly shaped array such as a rectangular array, a triangular array, a lattice array, or it may be more or less irregular.

In addition, the support matrix may include one or more filler material(s). The type of filler material(s) and their intended purpose is not particularly limited. As an example, the filler material may be selected to have a thermal conductivity that is the same or different than a base material of the component. That is, some or all of the voids defined between the web of supports may form an interconnected volume that may be filled with a dissimilar material. As such, the voids may be filled using a material that has a thermal conductivity that is higher (i.e. promote heat flow), the same, or lower (i.e. inhibit heat flow), as the material from which the support matrix is composed. Furthermore, there may be a number of filler materials infiltrated into the voids defined in the support matrix either sequentially or in combination as a mixture. For example, the filler material may be composed of a mixture of different materials. One such non-limiting example may include an industrial diamond dust that is mixed with copper powder such that, when heated the molten copper will carry the highly conductive diamond particles throughout the void structure, thereby providing increased thermal conductivity to the component.

In accordance with non-limiting embodiments, the targeted use of heat flow inhibiting filler material in an otherwise strong support matrix may be highly useful in one or more components of a molding material distributor, such as, for example, a back-up insulator or nozzle tip that must support high loads and otherwise span between, and otherwise contact, a hot component on one side and a cold component on the other, or in a component (e.g. mold stack insert) that defines part of the mold cavities in order to thermally separate regions thereof.

The component may be manufactured by all suitable methods such as, for example, free-form manufacturing including direct metal laser sintering (also known as selective laser sintering) and infiltration.

Non-Limiting Embodiment(s)

With reference to FIG. 1 there is depicted a schematic representation of a molding system 100 in accordance with a non-limiting embodiment. In particular, the molding system 100 is configured as an injection molding system that broadly includes a mold clamp 110, a mold 120, a molding material distributor 130, and a molding material preparation device 140.

The mold 120 includes a first part 122 and a second part 124 that when closed together define a plurality of molding cavities within which molded articles, such as, for example, preforms of the type for blow molding into containers, are moldable. The first part 122 is mounted to a moving platen 114 of the mold clamp 110. The second part 124 is mounted to the molding material distributor 130 which in turn is mounted on a stationary platen 116 of the mold clamp 110. In operation, the first part 122 is reciprocated relative to the second part 124 for opening and closing the mold 120 through relative movement between the moving platen 114 and the stationary platen 116. The molding material preparation device 140 is configured to prepare (e.g. melt) molding material (not shown) and to inject the molding material through the melt distributor 130 and into the plurality of molding cavities of the mold 120.

Various components of the molding system 100 may benefit from being configured as described previously. For example, and as shown with reference to FIG. 2, one or more members of a mold stack 126 may be so configured.

The non-limiting embodiment of the mold stack 126 is shown to broadly include a first portion 160 and a second portion 170 that are associated, in use, with the first part 122 and the second part 124 of the mold 120, respectively, and are configured to cooperate together to provide a mold cavity 179. The first portion 160 of the mold stack 126 includes a core insert 162, a lock ring 164, and a split insert 166. The second portion 170 of the mold stack includes a cavity insert 174 and a gate insert 172. This design of mold stack 126 is well known to those of skill in the art and requires little further explanation. Suffice it to state that: the core insert 162 defines an interior portion of the mold cavity 179; the lock ring 164 defines part of an end portion of the mold cavity 179; the split insert 166 defines an encapsulated portion of the mold cavity 179; the cavity insert 174 defines an exterior portion of the mold cavity 179; and the gate insert 172 defines an end portion of the mold cavity 179.

One or more of these members of the mold stack 126 may be configured to include a body having a support matrix defined in at least a portion thereof. Furthermore, the support matrix may be provided by a porous structure having a density gradient defined therein. The density gradient may be oriented such that a density of the porous structure increases towards a molding surface that is defined by the component.

Moreover, the support matrix may include a filler material therein and the filler material may have a different thermal conductivity (preferably higher) than a base material of the support matrix. The filler material may be introduced into the support matrix by known means, such as, for example, infiltration. The base material may be provided, for example, by a tool steel. The filler material may be provided, for example, by copper (i.e. copper alloy).

In the depicted non-limiting embodiment, as shown with reference to FIG. 3, the body of the core insert 162 may be configured to include a support matrix 163 in at least a portion thereof, wherein the support matrix 163 is provided by a porous structure that has a density gradient defined therein. More particularly, the support matrix 163 may be configured to include, without specific limitation, a base portion 169 having a low density and a transition portion 165 that is arranged between the base portion 169 and the molding surface 167, wherein a density of the transition portion changes from the low density of the base portion 169 to a fully dense structure across a width thereof.

Figure 4:
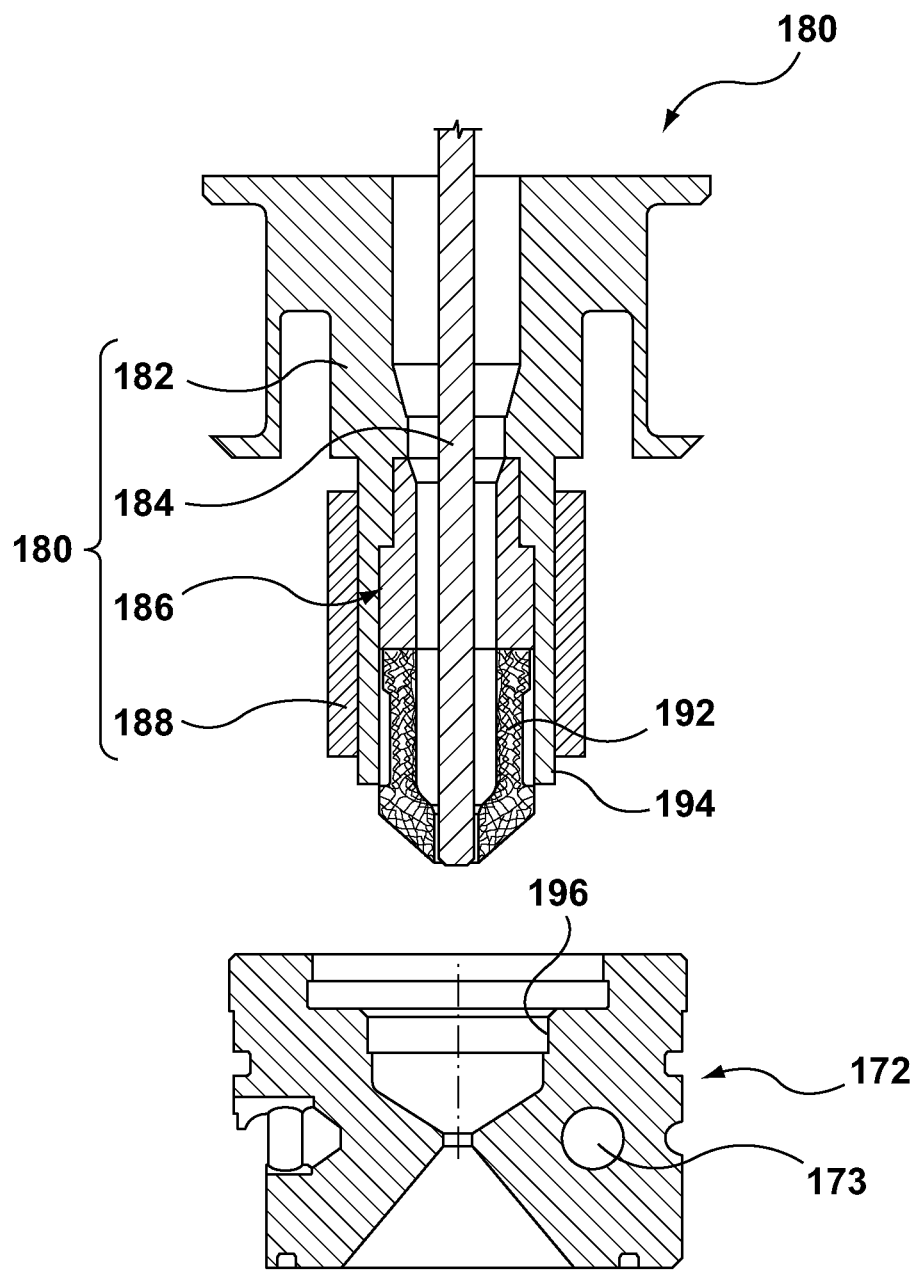
FIG. 4 depicts a cross-section view of a nozzle in accordance with another non-limiting embodiment.

With reference to FIG. 4, there is depicted a nozzle 180 in accordance with a non-limiting embodiment for use in the molding material distributor 130 (FIG. 1) and a gate insert 172 from the mold stack 126 (FIG. 2). In operation, a front part of the nozzle 180 is received within a receptacle of the gate insert 172 along contacting surfaces 194, 196 that are defined thereon, respectively, for connecting a source of molding material (not shown) to the mold cavity 179 (FIG. 2). The nozzle 180 broadly includes, amongst other things, a nozzle body 182, a nozzle tip 186, a valve member 184 and a heater 188. The overall configuration of the foregoing is fairly typical and would be generally recognized by those of skill in the art. In particular, the nozzle body 182 and the nozzle tip 186 are retained together and define, in cooperation, a melt channel for connecting, in use, the source of molding material (not shown) with the mold cavity 179 (FIG. 1). In operation, the valve member 184 is moveable within the melt channel to selectively control flow of the molding material therethrough. More particularly, it can be seen that the valve member 184 is a cylindrical stem that is axially moveable (by an actuator—not shown) to selectively block an outlet at a downstream end of the nozzle tip 186. Lastly, it may be appreciated that the heater 188 is thermally coupled to the nozzle body 182 for a heating thereof, in use, to maintain the molding material in the melt channel at a specified temperature required for molding. In this design it may be appreciated that the nozzle tip 186 is heated by virtue of conduction heat transfer with the heated nozzle body 182.

That being said, it may be appreciated that the nozzle tip 186 includes at least a front portion that has a support matrix 192 with filler material therein. Moreover, it may also be appreciated that the support matrix 192 may include a density gradient that increases towards surfaces (i.e. inner and outer) of the nozzle tip 186. The support matrix 192 may be formed from a relatively strong material, such as, for example, steel, that provides a skeleton within which to support the relatively weak but more thermally conductive filler material such as, for example, copper and alloys thereof. A technical effect of the foregoing is that the nozzle tip 186 may be configured to be strong yet highly thermally conductive. The strength is desirable to withstand injection pressure whereas the high thermal conductivity is desired to help conduct heat from the nozzle body 182 through to the portion of the melt channel that is defined in the nozzle tip 186.

In accordance with further non-limiting embodiments, not shown, portion(s) of the nozzle body 182 may be similarly configured.

Figure 5:
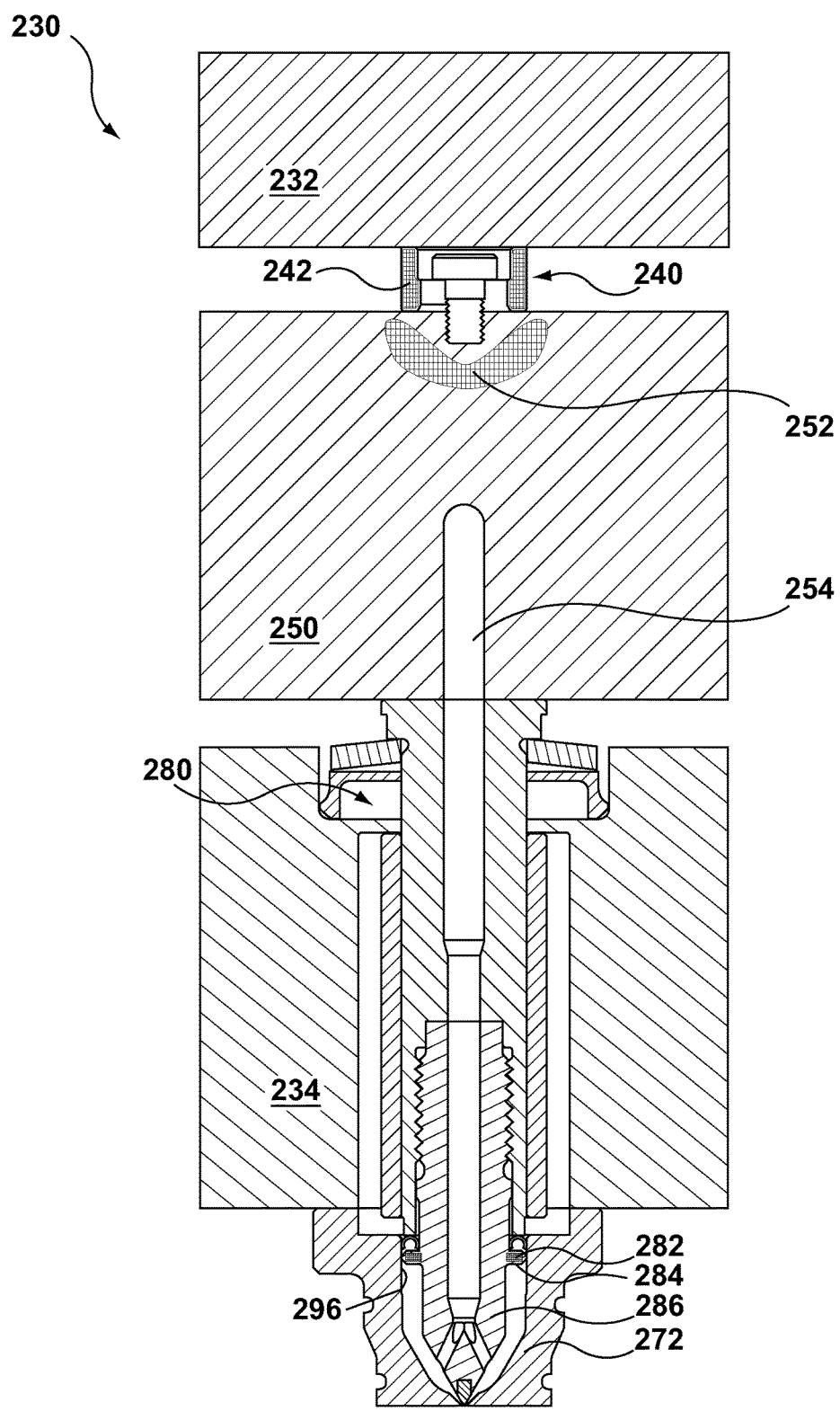
FIG. 5 depicts a cross-section through part of a molding material distributor in accordance with a further non-limiting embodiment.

With reference to FIG. 5, there is depicted a section through part of a molding material distributor 230 that has been structure in accordance with a non-limiting embodiment. The molding material distributor 230 is configured to distribute, in operation, molding material from a source (e.g. molding material preparation device 140—FIG. 1) to one or more molding cavities in a mold (not shown). The structure and operation of the molding material distributor 230 is quite typical, and as such a detailed explanation of the more or less traditional aspects will be kept quite brief. Suffice it to review that the molding material distributor 230 is shown to broadly include, amongst other things, a manifold plate 234, a backing plate 232, a manifold 250, and a nozzle 280. The manifold 250 is located in a pocket (not outlined) that is defined between the backing plate 232 and the manifold plate 234. The manifold 250 includes a network of melt channels 254 (one shown) that distribute the molding material to the nozzle 280 that abuts the manifold 250. The manifold 250 is held in a spaced relation between the backing plate 232 and the manifold plate 234 on the one side by a back-up insulator 240 and on the other by the nozzle 280, and in so doing the heated manifold 250 is kept generally insulated from the cooled plates. In contrast with traditional back-up insulators that are made from solid resilient materials, such as steel, the body of the back-up insulator 240 has been configured to include a portion therein having a support matrix 242. The support matrix 242 may be formed of the same material as the remainder of the back-up insulator 240 or something altogether different. The voids between the structural supports thereof may be air filled, filled with a relatively insulative material, or even evacuated (i.e. vacuum) wherein the voids between the structural supports may be largely vacant of any material/fluid. In this way, the back-up insulator 240 is configured to support high compressive load with operation of the molding material distributor 230 while also providing reduced thermal heat transfer (i.e. heat loss) between the manifold 250 and the backing plate 232.

Also shown in conjunction with the foregoing, although it could be used separately, the manifold 250 may also be configured to include a portion therein having a support matrix 252 in the region of the back-up insulator 240, although it may be used elsewhere therein. The support matrix 252 may be formed of the same material as the rest of the manifold 250, typically high strength steel, or something altogether different, and the voids between the structural supports thereof may be evacuated, air filled, or again filled with a relatively insulative material. In this way, the manifold 250 may be configured to support high compressive load with operation of the molding material distributor 230 while also providing reduced thermal heat transfer (i.e. heat loss) between the manifold 250 and the backing plate 232.

Alternatively, in in conjunction with the foregoing, the support matrix 252 may be similarly defined in the manifold 250 in the vicinity of the nozzle 280.

Also shown in conjunction with the foregoing, although it could be used separately, the nozzle 280 is shown to include a nozzle tip 286 having a seal ring 284 thereon that is configured to seal in contact with a contacting surface 296 of a gate insert 272 of the mold (not shown). As shown, a portion of the seal ring 284 may be configured to include a support matrix 282. The support matrix 282 may be formed of the same material as the rest of the nozzle tip 286, typically a highly thermally conductive alloy, such as those made from copper, or something altogether different, and the voids between the structural supports thereof may be air filled, or again filled with a relatively insulative material. In this way, the nozzle tip 286 may retain its strength while also providing reduced thermal heat transfer (i.e. heat loss) to the cooled gate insert 272 of the mold (not shown).

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A nozzle of a molding system, the nozzle comprising: a nozzle body; and
a nozzle tip disposed at a front part of the nozzle body; wherein the nozzle comprises a support matrix defined in at least a portion thereof, the support matrix forming a porous structure.

2. A nozzle of a molding system, the nozzle comprising: a nozzle body; and
a nozzle tip disposed at a front part of the nozzle body; wherein the support matrix includes a three-dimensional web of structural supports and
wherein a spacing between structural supports varies such that voids that are defined between the supports gradually change in volume across the web of supports.

3. The nozzle of claim 1, wherein the support matrix includes a filler material disposed therein.

4. A nozzle of a molding system, the nozzle comprising: a nozzle body; and
a nozzle tip disposed at a front part of the nozzle body; wherein the nozzle comprises a support matrix defined in at least a portion thereof, and
wherein voids defined in the support matrix are evacuated.

5. The nozzle of claim 3, wherein the filler material has a different thermal conductivity than a base material of the support matrix.

6. The nozzle of claim 5, wherein the filler material has a thermal conductivity that is higher than that of the base material.

7. The nozzle of claim 3, wherein the filler material is a mixture of different materials.

8. The nozzle of claim 7, wherein the filler material is a mixture of industrial diamond dust and copper powder.

9. The nozzle of claim 1, wherein the support matrix has a density gradient defined therein that is oriented such that a density of the support matrix increases towards a surface of the nozzle.

10. The nozzle of claim 1, wherein the support matrix includes a base portion having a low density and a transition portion that is arranged between the base portion and the surface of the nozzle, wherein the density of the transition portion changes from the low density of the base portion to a fully dense structure across a width thereof.

11. The nozzle of claim 1, wherein the nozzle defines a melt channel for distributing, in use, molding material to a mold.

12. The nozzle of claim 1, wherein at least a portion of the nozzle tip comprises the support matrix.

13. The nozzle of claim 12, wherein the nozzle tip includes at least a front portion having the support matrix with a filler material therein.

14. The nozzle of claim 12, wherein the support matrix includes a density gradient that increases towards surfaces of the nozzle tip.

15. The nozzle of claim 13, wherein the support matrix is formed from a relatively strong material that supports a relatively weak material, wherein the relatively weak material is more thermally conductive than the filler material.

16. The nozzle of claim 12, further comprising a seal ring disposed adjacent the nozzle tip, wherein the seal ring includes a support matrix.

17. The nozzle of claim 16, wherein the support matrix in the seal ring includes a filler material having a lower thermal conductivity than a material forming the seal ring.

* * * * *